United States Patent
Suzuki

Patent Number: 5,933,281
Date of Patent: Aug. 3, 1999

[54] ZOOM LENS SYSTEM

[75] Inventor: Kenzaburo Suzuki, Yokohama, Japan

[73] Assignee: Nikon Corporation, Tokyo, Japan

[21] Appl. No.: 08/946,454

[22] Filed: Oct. 7, 1997

[30] Foreign Application Priority Data

Oct. 7, 1996 [JP] Japan .................................. 8-286145

[51] Int. Cl.⁶ .................................................. G02B 15/14
[52] U.S. Cl. ........................................ 359/676; 359/683
[58] Field of Search ..................................... 359/676, 683

[56] References Cited

U.S. PATENT DOCUMENTS

| | | | |
|---|---|---|---|
| 4,437,732 | 3/1984 | Ishiyama | 359/683 |
| 4,636,040 | 1/1987 | Tokumaru | 359/683 |
| 5,189,557 | 2/1993 | Endo | 359/683 |
| 5,528,427 | 6/1996 | Tanaka et al. | 359/683 |
| 5,585,969 | 12/1996 | Endo | 359/683 |

FOREIGN PATENT DOCUMENTS 58-33531  7/1983  Japan .
3-71686  11/1991  Japan .

Primary Examiner—Georgia Epps
Assistant Examiner—Suzanne Letendre
Attorney, Agent, or Firm—Michael N. Meller

[57] ABSTRACT

A zoom lens system is provided having a first lens group with a positive refractive power; a second lens group with a negative refractive power; a third lens group with a positive refractive power; a fourth lens group with a negative refractive power; and a fifth lens group with a positive refractive power. The focal length at the wide-angle end is shorter than the diagonal line of the field of view. The fifth lens group is moved toward the object end of the system and the lens separation of each of the lens groups is changed for zooming from the wide-angle end to the telephoto end. At the same time, the system fulfills the following conditions:

$$2.0 < bf_w/f_w < 8.0 \quad (1)$$

$$4.5 < L_w/y < 20.0 \quad (2)$$

where $bf_w$ is the back focus at the wide-angle end; $L_w$ is the length at the wide-angle end from the first lens surface to the last lens surface; $f_w$ is the overall focal length at the wide-angle end; and y is the maximum image height.

8 Claims, 9 Drawing Sheets

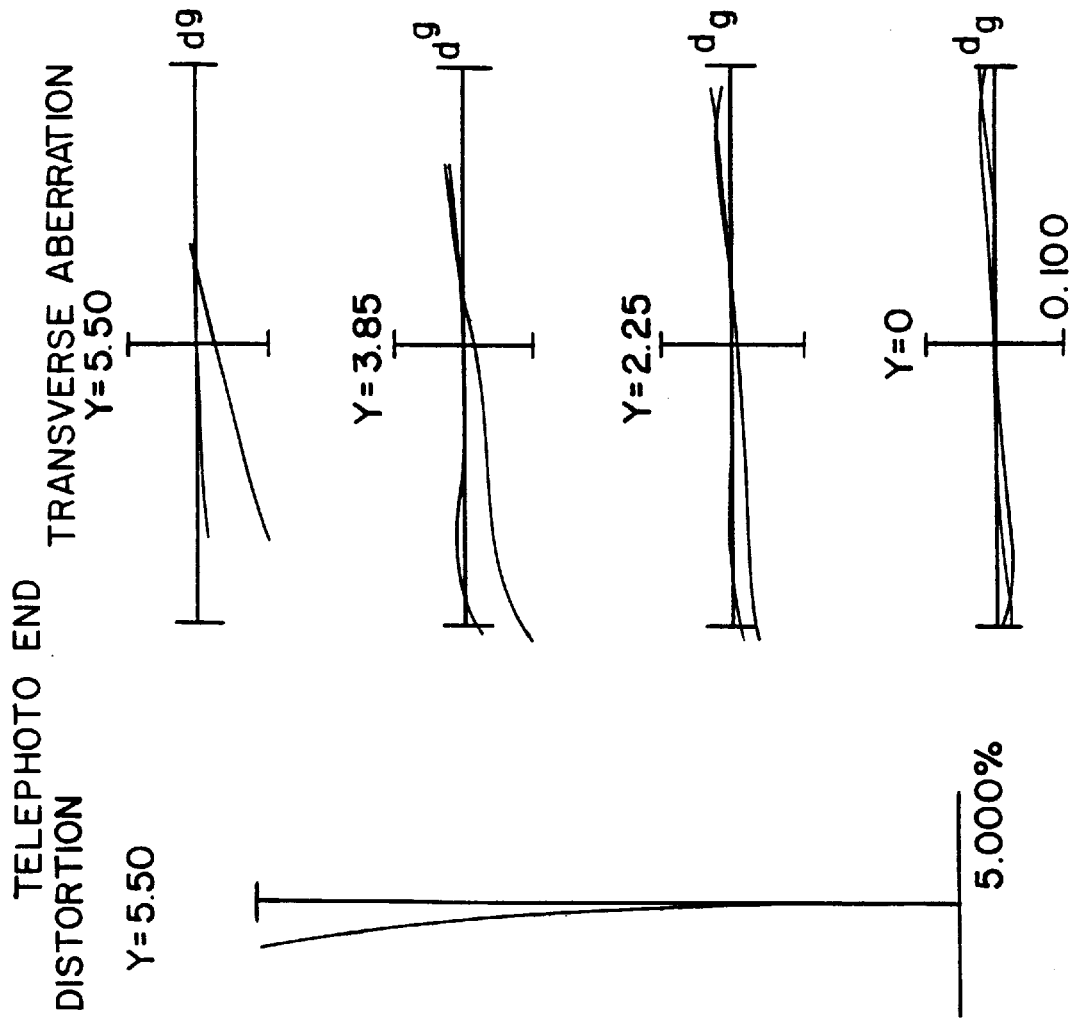
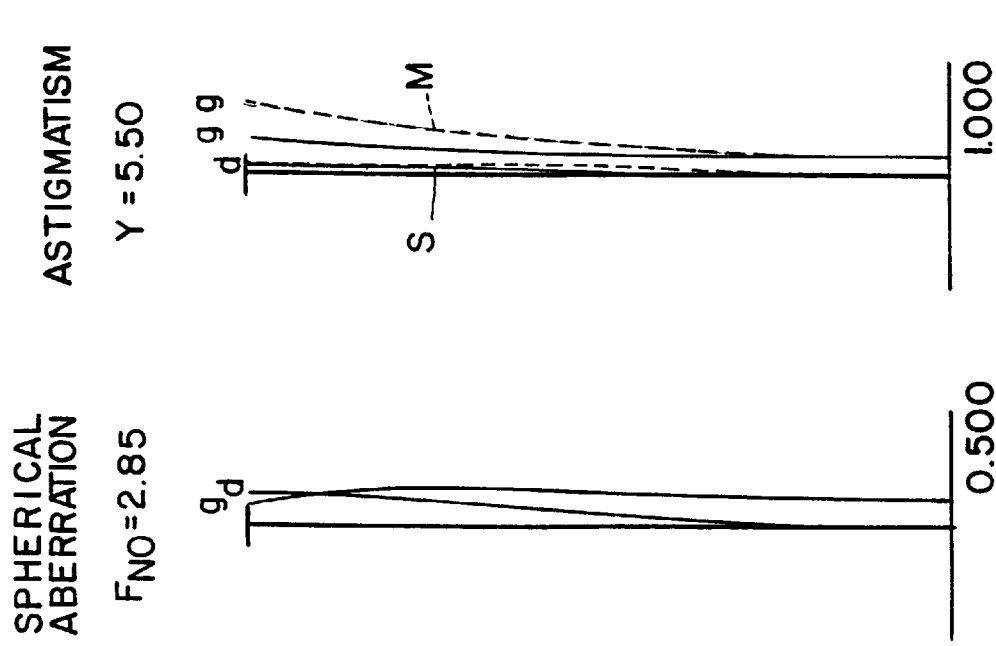
FIG.3

ZOOM LENS SYSTEM

The present invention relates to a zoom lens system. More particularly, the present invention relates to a high zoom-ratio zoom lens system which has a wide-field angle.

BACKGROUND OF THE INVENTION

One of the examples of a high zoom-ratio zoom lens system of conventional technology is disclosed in Japanese Laid-open Patent Application S58-33531. This zoom lens system has a relatively small back focus for the focal length at the wide-angle end, providing a small back focus with an F-number of F/4 to F/4.5, which is dark. Accordingly, it is not suitable for photographing a dark object.

An example of a high telecentric zoom lens system is disclosed in Japanese Laid-open Patent Application H3-71686. This zoom lens system, however, does not have a large field angle at the wide-angle end.

SUMMARY OF THE PRESENT INVENTION

Accordingly, it is an object of the present invention to overcome the problems of prior art solutions.

The apparatus incorporating the principles of the present invention provides a large aperture-ratio high-performance, and high zoom-ratio zoom lens system with a large field angle.

In a preferred embodiment of the present invention, a zoom lens system is provided comprising, in order from the object end:

a first lens group having a positive refractive power;

a second lens group having a negative refractive power;

a third lens group having a positive refractive power;

a fourth lens group having a negative refractive power; and a fifth lens group having a positive refractive power wherein the focal length at the wide-angle end of the zoom lens system is shorter than the diagonal line of the field of view. The fifth lens group is moved toward the object end and the lens separation between each of the lens groups is changed when zooming from the wide-angle end to the telephoto end of the system. At the same time, the following conditions are fulfilled:

$$2.0 < bf_W/f_W < 8.0$$

$$4.5 < L_W/y < 20.0$$

where:

$bf_W$ is the back focus at the wide-angle end;

$L_W$ is the length at the wide-angle end from the first lens surface to the last lens surface (the length of the overall lens system);

$f_W$ is the overall focal length at the wide-angle end; and $y$ is the maximum image height for the overall lens system.

The preferred embodiments of the present invention basically comprise:

a first lens group having a positive refractive power;

a second lens group having a negative refractive power;

a third lens group having a positive refractive power;

a fourth lens group having a positive refractive power; and a fifth lens group having a negative refractive power. In addition the elements of these lens groups fulfill several conditions to be described.

BRIEF DESCRIPTION OF THE DRAWINGS

The above and other objects, features, and advantages of the present invention will become more apparent from the following detailed description taken with the accompanying drawings, in which:

FIG. 3 is a diagram showing various aberrations at the telephoto end for Embodiment 1;

DESCRIPTION OF THE PREFERRED EMBODIMENTS

Figure 1:
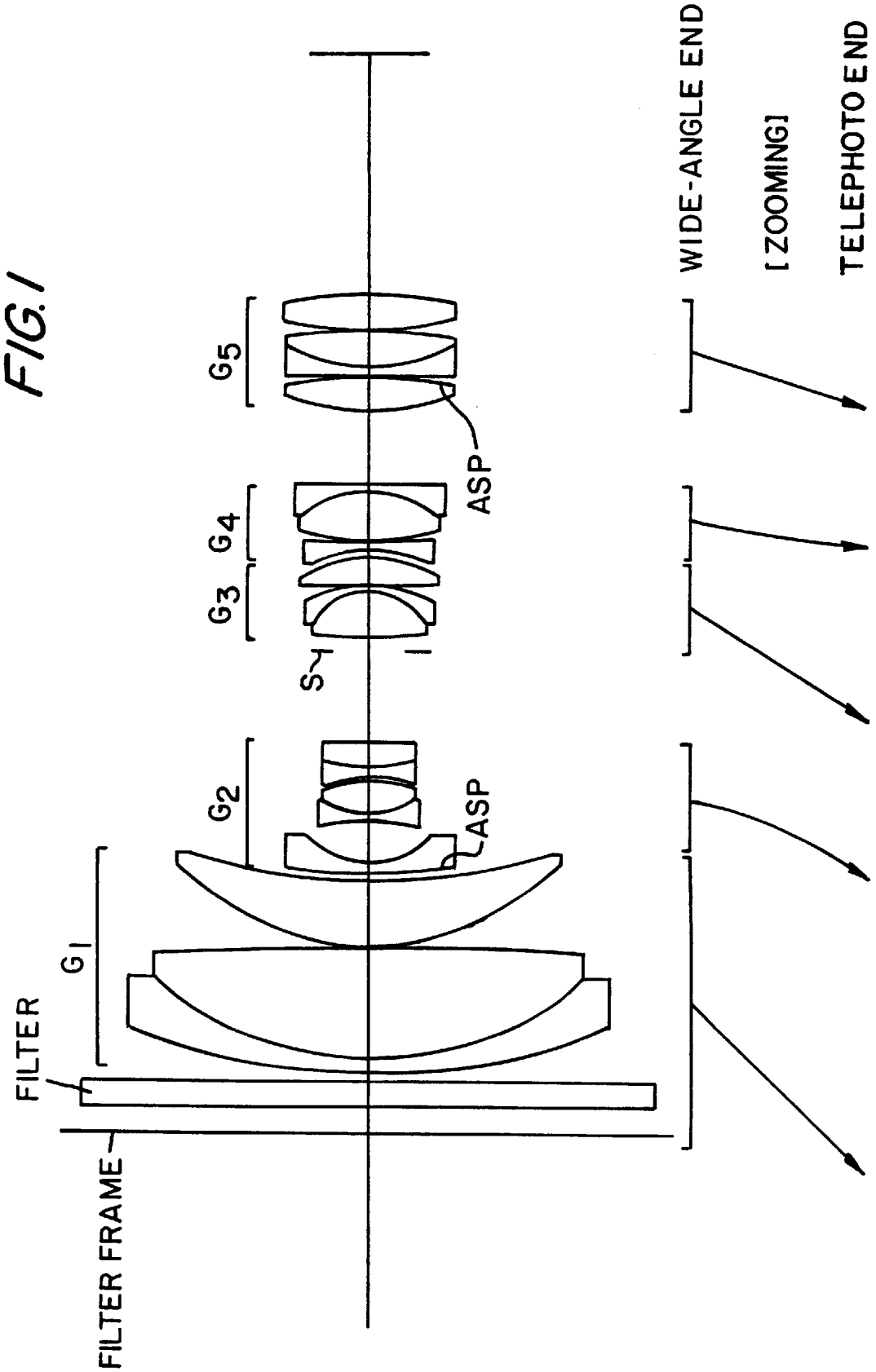
FIG. 1 is a layout of the zoom lens of Embodiment 1 of the present invention.
Figure 4:
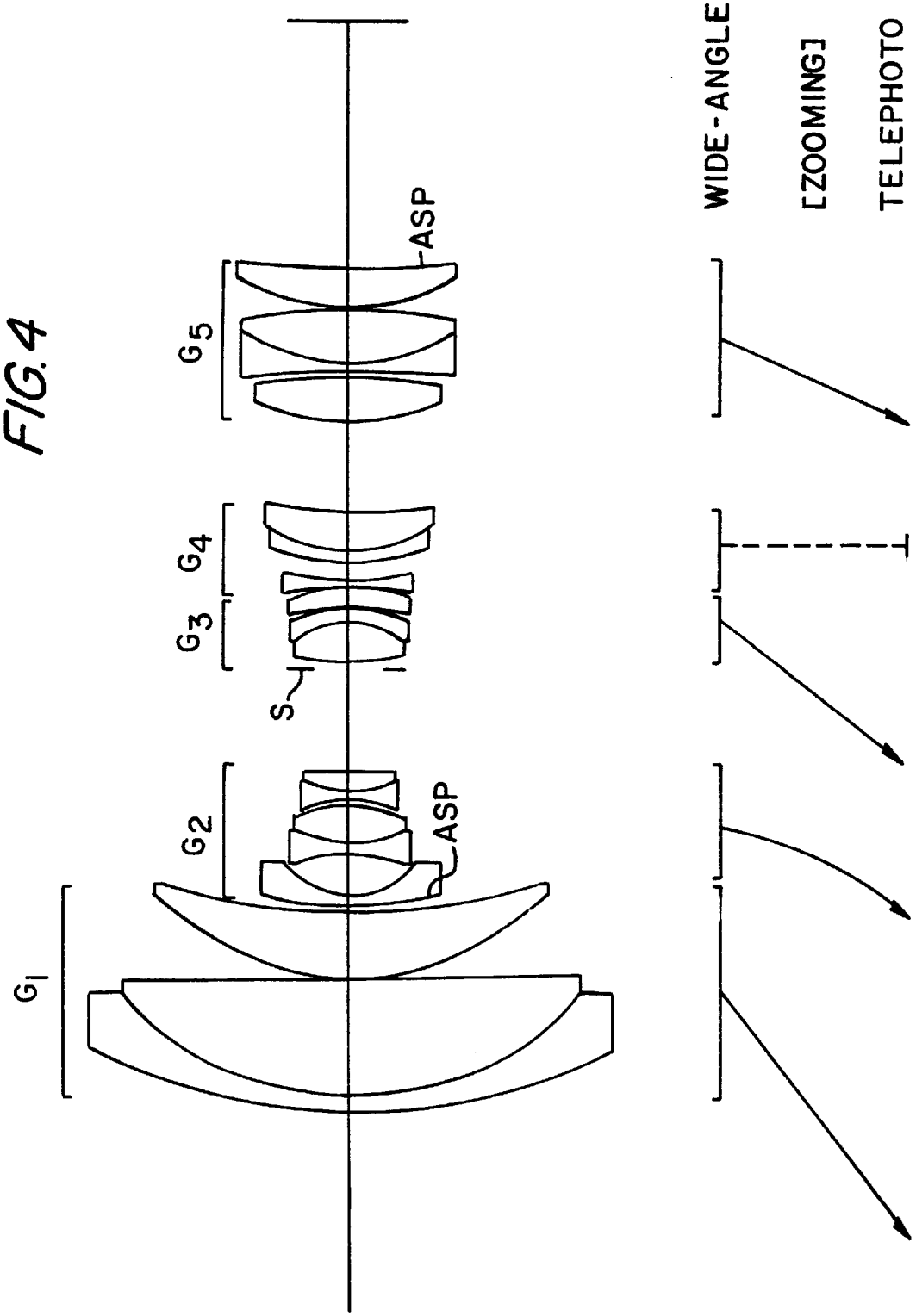
FIG. 4 is a layout of the zoom lens of Embodiment 2 of the present invention.
Figure 7:
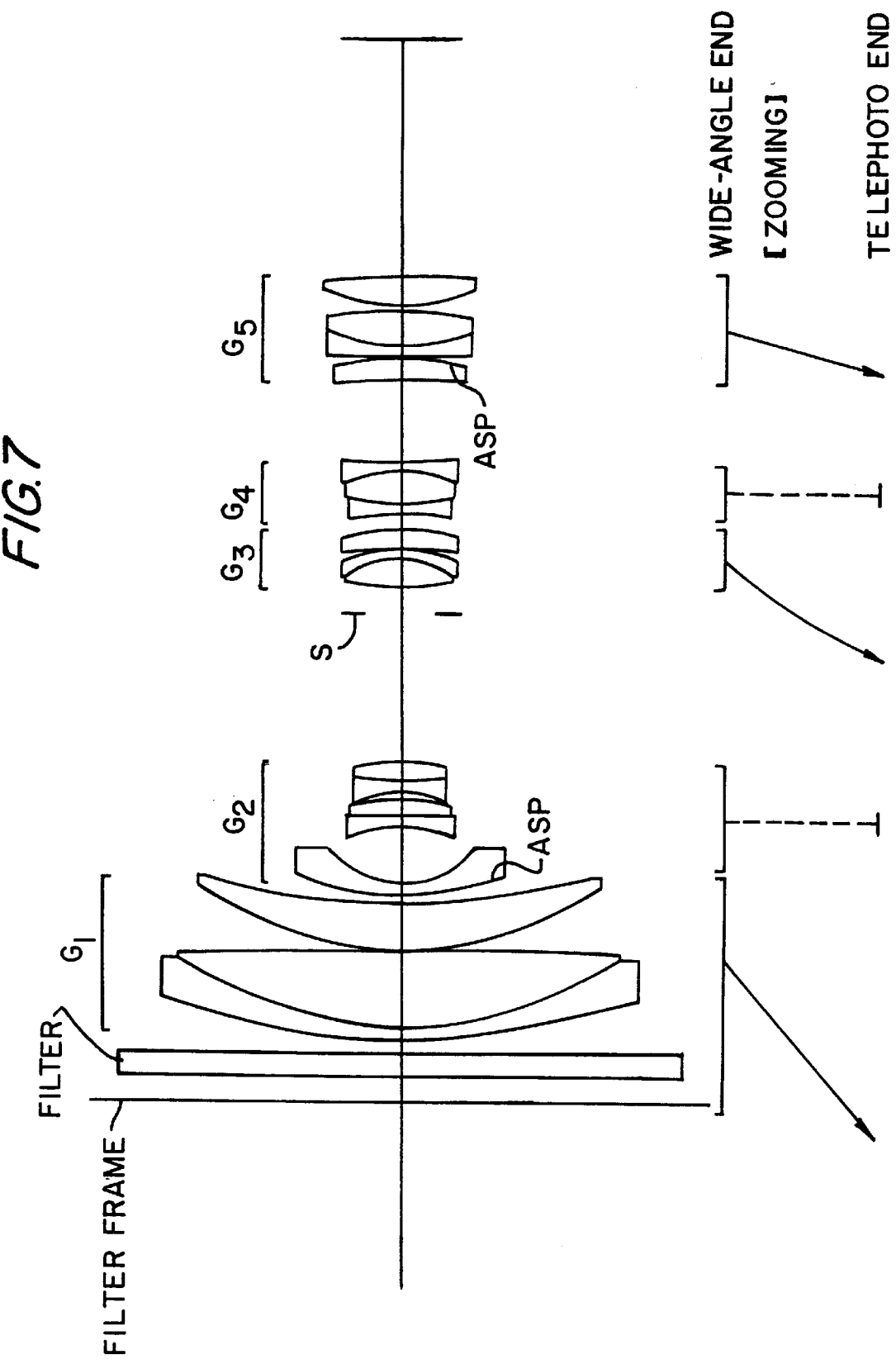
FIG. 7 is a layout of the zoom lens of Embodiment 3 of the present invention.

Preferable modes of the embodiments of the present invention are described with reference to the drawings attached. FIGS. 1, 4, and 7 respectively show the lens layout of the zoom lens system of Embodiments 1, 2, and 3 of the present invention. A zoom lens system of any embodiment comprises, in order from the object end:

a first lens group $G_1$ having a positive refractive power;

a second lens group $G_2$ having a negative refractive power;

a third lens group $G_3$ having a positive refractive power;

a fourth lens group $G_4$ having a negative refractive power; and a fifth lens group $G_5$ having a positive refractive power. The focal length $f_W$ at the wide-angle end is shorter than the diagonal line of the field of view. Zooming from the wide-angle end to the telephoto end is performed by moving the fifth lens group $G_5$ toward the object end and changing the lens separations between each of the lens groups $G_1$ through $G_5$. In Embodiment 1 (FIG. 1), all the lens groups move in the optical axial direction during zooming. In Embodiment 2 (FIG. 4), the second lens group $G_2$ is fixed during zooming. In Embodiment 3 (FIG. 7), the second lens group $G_2$ and the fourth lens group $G_4$ are fixed during zooming. In the figures, ASP indicates an aspherical lens surface.

The characteristics and advantages of the zoom lens system incorporating the principles of the present invention will be described briefly herein.

First, the zoom lens system is constructed of multi (five) lens groups. This provides a zoom lens system of excellent imaging performance which can be used as a high zoom-ratio zoom lens system. The lens separation can be small at the wide-angle end, which makes it possible to make a compact zoom lens system with a short lens separation at the wide-angle end. The multi-lens construction provides more freedom for lens groups during zooming, providing excellent imaging performance for an object located between the wide-angle and telephoto ranges.

In accordance with the principles of the present invention, it is advantageous for the zoom lens system to have a wide-angle lens in which the focal length at the wide-angle end is shorter than the diagonal length of the field of view.

In addition, in an optical system used for electronic imaging equipment, the zoom lens system is often located behind an optical low-pass filter, three colors separation filters, mirrors, and the like. The optical system incorporating the principles of the present invention can have a back focus large enough for these optical components.

Further, in order to decrease shading, the zoom lens system incorporating the principles of the present invention maintains a large amount of luminous intensity at the maximum image height. It is also telecentric to the image end.

It is desirable for all of the embodiments of the present invention to fulfill the following conditions:

$$2.0 < bf_w/f_w < 8.0 \quad (1)$$

$$4.5 < L_w/y < 20.0 \quad (2)$$

where:

$bf_w$ is the back focus at the wide-angle end;

$L_w$ is the length at the wide-angle end from the first lens surface to the last lens surface (the length of the overall lens system);

$f_w$ is the overall focal length at the wide-angle end; and $y$ is the maximum image height for the overall lens system.

Condition (1) defines an appropriate range for the ratio of the back focus $bf_w$ at the wide-angle end to the focal length $f_w$ of the overall zoom lens system. If the upper limit of condition (1) is exceeded, the back focus becomes too large, increasing the diameters of lenses in the fourth lens group $G_4$ or the fifth lens group $G_5$. This will be an obstacle to making a compact zoom lens system. It also increases the magnitude of fluctuation for coma aberration or image plane curvature during zooming, which is unfavorable.

If the lower limit of condition (1) is exceeded, the back focus will be too small, making it difficult to obtain a space for a filter and a mirror in the zoom lens system. The back focus is likely to be off telecentric at the image end, which is unfavorable. Distortion at the telephoto end will be large on the positive end, which is also unfavorable.

It is desirable that the upper limit of condition (1) be set at 5.0 and the lower limit at 2.7 to fully realize the advantageous effects of the present invention.

Condition (2) defines an appropriate range for the ratio of the overall lens length $L_w$ at the wide-angle end to the maximum image height $y$ of the overall zoom lens system. If the upper limit of condition (2) is exceeded, the overall length becomes too long, increasing the total weight of the lens system. Particularly, the diameters of lenses in the first lens group $G_1$ or the fifth lens group $G_5$ become too large, which will be an obstacle to making a compact zoom lens system.

If the lower limit of condition (2) is exceeded, the overall lens length $L_w$ at the wide-angle end will be too small, losing the freedom of correcting aberrations. It is generally desirable that many lens surfaces exist up to the point distanced from an aperture to correct aberrations excellently. However, when the lower limit of condition (2) is exceeded, all the lens surfaces become too close to the aperture, which makes it difficult to correct aberrations excellently. As a result, it will be particularly difficult to correct coma aberrations, providing an obstacle to obtaining excellent imaging performance. The Petzval sum will be distributed too much on the negative side, which is not favorable.

It is also desirable that the following condition is fulfilled for all of the embodiments of the present invention:

$$2.8 < bf_w/y < 10.0 \quad (3)$$

Condition (3) defines an appropriate range for the ratio of back focus $bf_w$ at the wide-angle end to the maximum image height $y$ of the overall zoom lens system. If the upper limit of condition (3) is exceeded, the back focus becomes too large, increasing the diameters of lenses in the fourth lens group $G_4$ or the fifth lens group $G_5$. This will be an obstacle to making a compact zoom lens system. It also increases the magnitude of fluctuation for coma aberration or image plane curvature during zooming, which is unfavorable. In addition, the maximum image height $y$ will be too small to be a realistically acceptable size.

If the lower limit of condition (3) is exceeded, the back focus will be too small, making it difficult to obtain space for a filter and a mirror in the zoom lens system. The back focus is likely to be off telecentric at the image end, which is unfavorable. Distortion at the telephoto end will be distributed too much on the positive end, which is also unfavorable. In addition, under these conditions, the image height $y$ will be too large. The imaging around the field angle can be easily deteriorated, which is unfavorable.

In the embodiments of the present invention, it is desirable that each of the following conditions are fulfilled:

$$0.1 < f_1/(F_{nT} \cdot f_T) < 3.0 \quad (4)$$

$$0.015 < |f_2/(F_{nT} \cdot f_T)| < 3.0 \quad (5)$$

where:

$f_T$ is the focal length at the telephoto end for the overall system;

$F_{nT}$ is the F-number at the telephoto end when the overall system is in the full-aperture state;

$f_1$ is the focal length of the first lens group $G_1$; and $f_2$ is the focal length of the second lens group $G_2$.

Condition (4) defines an appropriate range for the ratio of the focal length $f_1$ in the first lens group $G_1$ to the focal length at the telephoto end for the overall system and $F_{nT}$(F-number). If the lower limit of condition (4) is exceeded, the optical system will be dark, which is undesirable. The focal length $f_1$ of the first lens group $G_1$ will be much smaller than necessary. It is likely to generate negative spherical aberration, making the Petzval sum too large on the positive side.

If the upper limit of condition (4) is exceeded, the optical system will be too bright, making it difficult to correct various aberrations. It also increases the total length of the lens system because the focal length $f_1$ of the first lens group $G_1$ will be too long. This will increase the aperture diameter, which is unfavorable. It is likely to generate positive spherical aberrations.

To fully realize the beneficial effects of the present invention, it is desirable that the upper limit of condition (4) be set at 1.0 and the lower limit at 0.2.

Condition (5) defines an appropriate range for the ratio of the second lens group $G_2$ to the focal length at the telephoto end for the overall system and $F_{nT}$ (F-number). If the lower limit of condition (5) is exceeded, the optical system will be too dark, which is unfavorable. The focal length $f_2$ of the second lens group $G_2$ will be much smaller than necessary. It is likely to generate positive spherical aberrations, making the Petzval sum too large on the negative side, which is also unfavorable.

If the upper limit of condition (5) is exceeded, the optical system will be too bright, making it difficult to correct various aberrations. The focal length $f_2$ of the second lens group $G_2$ will be too long, requiring too much lens separation on the axis for zooming, increasing the total length of the zoom lens system. This will increase the aperture diameter, which is unfavorable.

It is also desirable that the following conditions are fulfilled for each of the embodiments of the present invention:

$$0.3<|f_4/bf_w|<2.0 \qquad (6)$$

$$0.3<|f_4|/f_w<9.0 \qquad (7)$$

$$-3.0<L_p/f_w<3.0 \qquad (8)$$

where:

$f_4$ is the focal length of the fourth lens group $G_4$; and $L_p$ is the distance on the optical axis at the wide-angle end measured from the principal point H at the object end of the optical system, which is more toward the image end than the aperture stop S, to the aperture stop S. (When the aperture stop S is more toward the object side than the principal point H at the object end, $L_p$ is negative. If the aperture is more toward the principal point H end than the object end, $L_p$ is positive).

Condition (6) defines an appropriate range for the ratio of the fourth lens group $G_4$ to the back focus $bf_w$ at the wide-angle end. If condition (6) is exceeded, the focal length of the fourth lens group $G_4$ will be too large. As a result, the back focus will be too small to correct aberration. In addition, it will be difficult to obtain an appropriate telecentricity, which is unfavorable.

If the lower limit is exceeded, the focal length $f_4$ of the fourth lens group $G_4$ will be too small. The Petzval sum will be distributed too much on the negative end, increasing the image plane curvature. In addition, it will be particularly difficult to correct spherical aberration among all the aberrations.

Condition (7) defines an appropriate range for the ratio of the fourth lens group $G_4$ to the total focal length of the system $f_w$ at the wide-angle end. If condition (7) is exceeded, the focal length of the fourth lens group $G_4$ will be too large during zooming. As a result, the total length will be too large. In addition, the image curvature is likely to be more toward the positive end during zooming, which is unfavorable.

If the lower limit is exceeded, the focal length $f_4$ of the fourth lens group $G_4$ will be too small. The Petzval sum will be distributed too much on the negative end, increasing the image plane curvature, which is unfavorable. In addition, it will be particularly difficult to correct spherical aberration among all aberrations.

To fully realize the advantageous effects of the present invention, it is desirable that the upper limit of condition (7) be set at 7.0 and the lower limit at 2.0.

Condition (8) defines an appropriate range for the ratio of $L_p$ to the focal length $f_w$ at the wide-angle end. If the upper limit or lower limit of condition (8) is exceeded, the lens system will be off telecentric and is likely to cause shading, which is not favorable. If the upper limit of condition (8) is exceeded, the lens diameter at the image end will be larger than that at the aperture stop. Astigmatism deviation at the wide-angle end will also be too large, increasing distortion in the negative direction at the wide-angle end and at the telephoto end.

If the lower limit of condition (8) is exceeded, it is difficult to obtain an appropriate back focus. Spherical aberration will increase too much in the negative direction at the wide-angle end and at the telephoto end. Coma aberration will increase to a great extent as well.

In the mid-range objective state (intermediate the wide-angle and telephoto ends) or at the telephoto end, it is desirable that condition (8) be fulfilled.

The zooming motion of each of the zoom lens systems according to the magnification distribution of each of the lens groups will be described. In the apparatus incorporating the principles of the present invention, during zooming from the wide-angle end to the telephoto end, the image magnification of the second lens group $G_2$ and the fifth lens group $G_5$ can be increased constantly. This configuration provides efficient magnification, which is preferable for a zoom lens system. It is desirable, however, that the zoom ratio of the second lens group $G_2$ does not exceed 1 if a wide-angle lens is used.

More specifically, it is desirable that the fifth lens group $G_5$ moves toward the object end during zooming from the wide-angle end to the telephoto end. Therefore, the back focus becomes longer at the telephoto end than at the wide-angle end. This increases the zoom ratio of the fifth lens group $G_5$ during zooming from the wide-angle end to the telephoto end. This is desirable for high-power magnification and high-imaging performance.

In the same manner, it is desirable that the first lens group $G_1$ is moved toward the object end during zooming from the wide-angle end to the telephoto end. This not only can reduce the total length of the lens system at the wide-angle end but also can reduce aberration, providing excellent imaging performance.

It is also desirable that the third lens group $G_3$ is moved toward the object end during zooming from the wide-angle end to the telephoto end. With this configuration, a preferably compact zoom lens system which is short at the wide-angle end can be obtained.

It is also desirable that the lens separation of the first lens group $G_1$ from the second lens group $G_2$ is larger at the telephoto end than that at the wide-angle end. Similarly, the lens separation of the third lens group $G_3$ from the fourth lens group $G_4$ should increase. On the other hand, the lens separation of the second lens group $G_2$ from the third lens group $G_3$ is smaller at the telephoto end than at the wide-angle end. This is also true for the lens separation of the fourth lens group $G_4$ from the fifth lens group $G_5$. With this configuration, the entire zoom lens can be substantially telecentric at the image end throughout the zooming range.

If telecentricity is given a high priority, then it is not necessary for the fourth lens group $G_4$ to increase its zoom ratio during zooming from the wide-angle end to the telephoto end. On the other hand, if high-power magnification is given the higher priority, the fourth lens group $G_4$ should have an increased zoom ratio.

In a zoom lens system in general, it is convenient that a zoom lens system of simple configuration can be obtained by fixing one of the lens groups during zooming or by moving a plurality of lens groups along the same moving profile. In the apparatus incorporating the principles of the present invention, at least one of the second lens group $G_2$ and the fourth lens group $G_4$ can be fixed without deteriorating the high-imaging performance which the zoom lens system already has. The second lens group $G_2$ and the fourth lens group $G_4$ are likely to lose imaging performance due to any eccentric error. Therefore, it is very desirable, from a manufacturing point of view, that each of these lenses are fixed.

The various embodiments of the present invention will be described in detail, referring to FIGS. 1, 4, and 7. The first lens group $G_1$ comprises at least one composite lens.

It is also desirable that the second lens group $G_2$ comprises a concave aspherical surface (ASP). This works as an advantage in providing a wide-angle zoom lens. Particularly, it is desirable that the surface facing the object end be made aspherical. It is further desirable that the aspherical surface is shaped such that its refractive power decreases with distance from the optical axis.

It is desirable that the third lens group $G_3$ comprises an aperture stop, S, within the group or near the lens group. Particularly, if the aperture stop is arranged at the object end of the third lens group $G_3$, various aberrations can be well balanced. It is also desirable that the third lens group $G_3$ comprises at least one composite lens. By moving the entire or a part of the third lens group $G_3$ in the optical axial direction during focusing, aberration fluctuation can be kept small, which is preferable.

It is also desirable that the fourth lens group $G_4$ comprises at least one composite lens. To achromatize the bonding surface sufficiently, the following condition should be fulfilled:

$$10 < \Delta 84$$

where:

$\Delta v$ is the difference in the Abbe number.

When there are a plurality of bonding surfaces, it is desirable that the above condition is fulfilled by the bonding surface which is facing the object end.

It is ideal that the fifth lens group $G_5$ comprises at least one composite lens to be achromatized. It is also desirable that it has one aspherical surface (ASP). The lens system of this configuration can correct coma aberration or distortion excellently. It is desirable that the aspherical surface is on a convex lens. With this, an appropriate back focus can be obtained for high-imaging performance.

Note that if a glass of distributed index of refraction is added, the zoom lens system can obtain better optical performance. If a special low discrete glass (tei-bunsan glass) is used in the first lens group $G_1$ or the fifth lens group $G_5$, chromatic aberration can be further reduced, which is preferable.

The following Tables 1, 2, and 3 show various lens values for Embodiments 1, 2, and 3 respectively.

In the various lens values section in each of the tables, No indicates the lens surface number counted from the object end, r indicates the radius of curvature of each of the lens surfaces, d indicates the lens separation of each of the lens surfaces, $v_d$ indicates the Abbe number on the d-line of each of the lenses ($\lambda$=587.6 nm), and $n_d$ and $n_g$ respectively indicate the indexes of refraction on the d-line and the g-line ($\lambda$=435.8 nm). The lens surface marked with an asterisk (*) indicates an aspherical surface. Regarding the aspherical lens surface, r is the radius of curvature at the peak and the shape of the aspherical surface can be expressed by the following mathematical equation (a):

$$x = \frac{y^2/r}{1+\sqrt{1-\kappa \cdot y^2/r^2}} + \sum C_n \cdot y^n \quad (a)$$

where:

x is the distance in the optical axial direction measured from the peak of the lens surface;

y is the height from the optical axis;

r is the radius of curvature at the peak of the lens surface;

$\kappa$ is the conical coefficient; and $C_n$ is the coefficient of the n order aspherical surface. Conical coefficient $\kappa$ and Cn are shown in the "Aspherical Data." Any aspherical surface which is not indicated in the "aspherical surface data" has a coefficient of aspherical surface $C_n$ of 0.

In Table 4, various values associated with each of the conditions for each of the embodiments and values for each of the conditions are indicated.

TABLE 1

Embodiment 1
Variable Lens Values

| No. | r | d | $v_d$ | $n_d$ | $n_g$ |
|---|---|---|---|---|---|
| 1. | (filter frame) | 2.7700 | | | |
| 2. | ∞ | 2.5000 | 64.10 | 1.516800 | 1.526703 |
| 3. | ∞ | 0.8000 | | | |
| 4. | 68.2442 | 1.5000 | 23.01 | 1.860741 | 1.910649 |
| 5. | 33.7783 | 11.8000 | 67.87 | 1.593189 | 1.604034 |
| 6. | −343.7562 | 0.0500 | | | |
| 7. | 27.0050 | 7.0000 | 52.30 | 1.748099 | 1.765893 |
| 8. | 67.2635 | (d8) | | | |
| *9. | 112.5317 | 1.2000 | 43.35 | 1.840421 | 1.864916 |
| 10. | 9.5639 | 4.3000 | | | |
| 11. | −20.7077 | 0.8000 | 43.35 | 1.840421 | 1.864916 |
| 12. | 9.9760 | 3.5000 | 27.83 | 1.699110 | 1.732332 |
| 13. | −10.6698 | 0.3000 | | | |
| 14. | −9.7544 | 0.8000 | 43.35 | 1.840421 | 1.864916 |
| 15. | 17.0776 | 2.5000 | 28.19 | 1.740000 | 1.774461 |
| 16. | −283.8170 | ($d_{16}$) | | | |
| 17. | (stop) | 1.5000 | | | |
| 18. | 65.0682 | 4.5000 | 70.41 | 1.487490 | 1.495932 |
| 19. | −7.1783 | 1.0000 | 49.45 | 1.772789 | 1.792324 |
| 20. | −15.2368 | 0.0540 | | | |
| 21. | −103.0597 | 2.7000 | 70.41 | 1.487490 | 1.495932 |
| 22. | −12.2145 | ($d_{22}$) | | | |
| 23. | −19.0418 | 1.0000 | 52.30 | 1.748099 | 1.765893 |
| 24. | 73.3497 | 0.2000 | | | |
| 25. | 28.2941 | 5.0000 | 32.17 | 1.672700 | 1.699894 |
| 26. | −12.8238 | 0.8000 | 53.93 | 1.713000 | 1.729417 |
| 27. | −337.8415 | ($d_{27}$) | | | |
| 28. | 26.5356 | 3.5000 | 60.23 | 1.518350 | 1.528997 |
| *29. | −46.5262 | 0.1000 | | | |
| 30. | 396.0539 | 1.0000 | 23.01 | 1.860741 | 1.910649 |
| 31. | 18.1581 | 3.7000 | 82.52 | 1.497820 | 1.505265 |
| 32. | −56.1679 | 0.1000 | | | |
| 33. | 41.0877 | 3.7000 | 82.52 | 1.497820 | 1.505265 |
| 34. | −45.1588 | (bf) | | | |

Aspherical Surface Data
Embodiment 1
No. 9

| $\kappa$ = 1.000 | $C_4$ = 1.85900 × $10^{-5}$ | $C_6$ = 4.69470 × $10^{-7}$ |
|---|---|---|
| | $C_8$ = −7.22320 × $10^{-9}$ | $C_{10}$ = 2.78440 × $10^{-11}$ |

No. 29

| $\kappa$ = 1.000 | $C_4$ = 3.39240 × $10^{-5}$ | $C_6$ = 7.19760 × $10^{-10}$ |
|---|---|---|
| | $C_8$ = −3.19900 × $10^{-10}$ | $C_{10}$ = 2.01280 × $10^{-12}$ |

Variable Lens Separation Values
Embodiment 1

| | Wide-Angle End | Telephoto End |
|---|---|---|
| $d_8$ | 0.79674 | 19.59573 |
| $d_{16}$ | 9.73443 | 0.82963 |
| $d_{22}$ | 0.58097 | 18.54715 |
| $d_{27}$ | 7.78114 | 1.18423 |
| bf | 25.20443 | 33.99531 |

TABLE 2

Embodiment 2
Variable Lens Values

| No. | r | d | $\nu_d$ | $n_d$ | $n_g$ |
|---|---|---|---|---|---|
| 1. | 56.7539 | 1.5000 | 23.01 | 1.860741 | 1.910649 |
| 2. | 30.5308 | 12.0000 | 65.42 | 1.603001 | 1.614372 |
| 3. | 581.6635 | 0.0500 | | | |
| 4. | 27.2253 | 7.0000 | 53.93 | 1.713000 | 1.729417 |
| 5. | 79.3611 | ($d_5$) | | | |
| *6. | 35.3746 | 1.0000 | 39.82 | 1.869940 | 1.897730 |
| 7. | 8.1163 | 4.3000 | | | |
| 8. | -15.9752 | 1.0000 | 45.37 | 1.796681 | 1.818801 |
| 9. | 15.0026 | 0.0500 | | | |
| 10. | 12.9949 | 3.7000 | 27.63 | 1.740771 | 1.776142 |
| 11. | -14.3934 | 0.5000 | | | |
| 12. | -12.6887 | 1.0000 | 45.37 | 1.796681 | 1.818801 |
| 13. | 12.4930 | 2.0000 | 30.04 | 1.698950 | 1.729431 |
| 14. | -102.5225 | ($d_{14}$) | | | |
| 15. | (stop) | 0.7000 | | | |
| 16. | 28.3613 | 4.2000 | 53.48 | 1.547390 | 1.560219 |
| 17. | -8.5437 | 1.0000 | 45.37 | 1.796681 | 1.818801 |
| 18. | -21.0250 | 0.0500 | | | |
| 19. | -42.2069 | 2.5000 | 64.10 | 1.516800 | 1.526703 |
| 20. | -15.7371 | ($d_{20}$) | | | |
| 21. | -27.0748 | 0.6000 | 52.30 | 1.748099 | 1.765893 |
| 22. | 45.2285 | 1.8000 | | | |
| 23. | 23.0689 | 1.0000 | 49.45 | 1.772789 | 1.792324 |
| 24. | 14.0001 | 4.0000 | 35.51 | 1.595071 | 1.616844 |
| 25. | 57.4489 | ($d_{25}$) | | | |
| 26. | 25.1038 | 4.5000 | 82.52 | 1.497820 | 1.505265 |
| 27. | -53.7101 | 0.5000 | | | |
| 28. | -106.8877 | 0.8000 | 27.63 | 1.740771 | 1.776142 |
| 29. | 19.8786 | 5.4000 | 67.87 | 1.593189 | 1.604034 |
| 30. | -52.9674 | 0.1000 | | | |
| 31. | 20.6453 | 4.2000 | 60.23 | 1.518350 | 1.528997 |
| *32. | -289.8800 | (bf) | | | |

Aspherical Surface Data
Embodiment 2
No. 6

$\kappa = 1.000$    $C_4 = -7.40550 \times 10^{-6}$    $C_6 = 3.84200 \times 10^{-7}$
          $C_8 = -4.25680 \times 10^{-9}$    $C_{10} = 9.61370 \times 10^{-12}$

No. 32

$\kappa = 1.000$    $C_4 = 3.47800 \times 10^{-5}$    $C_6 = 1.31740 \times 10^{-8}$
          $C_8 = -9.25880 \times 10^{-11}$    $C_{10} = 4.80680 \times 10^{-13}$

Variable Lens Separation Values
Embodiment 2

| | Wide-Angle End | Telephoto End |
|---|---|---|
| $d_5$ | 0.46148 | 19.55296 |
| $d_{14}$ | 10.49817 | 1.18183 |
| $d_{20}$ | 0.04866 | 21.06623 |
| $d_{25}$ | 9.40014 | 0.80897 |
| bf | 24.94325 | 33.53441 |

TABLE 3

Embodiment 3
Variable Lens Values

| No. | r | d | $\nu_d$ | $n_d$ | $n_g$ |
|---|---|---|---|---|---|
| 1. | (filter frame) | 3.0000 | | | |
| 2. | ∞ | 2.5000 | 64.10 | 1.516800 | 1.526703 |
| 3. | ∞ | 1.2000 | | | |
| 4. | 77.0938 | 1.5000 | 23.01 | 1.860741 | 1.910649 |
| 5. | 43.2588 | 8.2000 | 60.03 | 1.640000 | 1.653133 |
| 6. | -593.1460 | 0.1000 | | | |
| 7. | 37.9264 | 5.2092 | 52.30 | 1.748099 | 1.765893 |
| 8. | 87.3198 | ($d_8$) | | | |
| *9. | 40.9413 | 1.2000 | 43.35 | 1.840421 | 1.864916 |
| 10. | 10.9488 | 6.3054 | | | |
| 11. | -13.6115 | 1.0107 | 43.35 | 1.840421 | 1.864916 |
| 12. | 442.1861 | 1.8370 | 30.04 | 1.698950 | 1.729431 |
| 13. | -17.8652 | 0.7754 | | | |
| 14. | -11.4552 | 1.3317 | 43.35 | 1.840421 | 1.864916 |
| 15. | 72.7457 | 2.0757 | 28.19 | 1.740000 | 1.774461 |
| 16. | -19.5184 | ($d_{16}$) | | | |
| 17. | (stop) | 3.0000 | | | |
| 18. | 29.2483 | 3.0289 | 70.41 | 1.487490 | 1.495932 |
| 19. | -9.6805 | 1.0000 | 49.45 | 1.772789 | 1.792324 |
| 20. | -18.4595 | 0.1000 | | | |
| 21. | -48.0813 | 2.1030 | 70.41 | 1.487490 | 1.495932 |
| 22. | -21.6423 | ($d_{22}$) | | | |
| 23. | -39.6851 | 1.0000 | 52.30 | 1.748099 | 1.765893 |
| 24. | 21.2904 | 0.1000 | | | |
| 25. | 22.1376 | 3.7124 | 32.17 | 1.672700 | 1.699894 |
| 26. | -14.5738 | 1.0000 | 53.93 | 1.713000 | 1.729417 |
| 27. | -278.6524 | ($d_{27}$) | | | |
| 28. | -888.0202 | 2.4857 | 60.23 | 1.518350 | 1.528997 |
| *29. | -29.8742 | 0.1000 | | | |
| 30. | 235.1578 | 1.0000 | 23.01 | 1.860741 | 1.910649 |
| 31. | 17.8846 | 4.0276 | 70.41 | 1.487490 | 1.495932 |
| 32. | -40.9855 | 0.4788 | | | |
| 33. | 20.0878 | 3.1541 | 70.41 | 1.487490 | 1.495932 |
| 34. | -63.8370 | (bf) | | | |

Aspherical Surface Data
Embodiment 3
No. 9

$\kappa = 1.000$    $C_4 = 2.6150 \times 10^{-5}$    $C_6 = 3.73920 \times 10^{-8}$
          $C_8 = -4.56150 \times 10^{-10}$    $C_{10} = 6.64660 \times 10^{-12}$
$\kappa = 1.000$    $C_4 = -2.27310 \times 10^{-6}$    $C_6 = 7.17320 \times 10^{-9}$
          $C_8 = 8.08310 \times 10^{-10}$    $C_{10} = -6.44520 \times 10^{-12}$

Variable Lens Separation Values
Embodiment 3

| | Wide-Angle End | Telephoto End |
|---|---|---|
| $d_8$ | 0.83708 | 26.82256 |
| $d_{16}$ | 15.95351 | 0.46500 |
| $d_{22}$ | 1.54283 | 17.03134 |
| $d_{27}$ | 8.83053 | 1.84893 |
| bf | 25.88278 | 32.86437 |

TABLE 4

| Embodiment Number | 1 | 2 | 3 |
|---|---|---|---|
| $bf_w$ | 25.204 | 24.943 | 25.883 |
| $f_w$ | 7.800 | 7.800 | 8.0 |
| $L_w$ | 81.497 | 85.858 | 82.999 |
| y | 5.5 | 5.5 | 5.5 |
| $f_1$ | 42.189 | 43.325 | 54 |
| $f_2$ | -5.108 | -6.123 | -8.16 |
| $f_3$ | 18.854 | 21.530 | 24.8 |
| $f_4$ | -38.045 | -29.749 | -42.25 |
| $f_5$ | 24.115 | 20.853 | 23.6 |
| $F_{nT}$ | 2.84 | 2.89 | 2.89 |
| $f_T$ | 52.350 | 52.500 | 52.500 |
| $L_p$ | 0.603 | 4.082 | 2.649 |
| $\Delta\nu$ | 21.76 | 13.94 | 21.76 |
| (1) $bf_w/f_w$ | 3.231 | 3.198 | 3.235 |
| (2) $L_w/y$ | 14.818 | 15.611 | 15.091 |
| (3) $bf_w/y$ | 4.583 | 4.535 | 4.706 |
| (4) $f_1/(F_{nT} \cdot f_T)$ | 0.284 | 0.286 | 0.356 |
| (5) $|f_2/(F_{nT} \cdot f_T)|$ | 0.0344 | 0.0404 | 0.0538 |
| (6) $|f_4/bf_w|$ | 1.509 | 1.193 | 1.632 |
| (7) $|f_4|/f_w$ | 4.878 | 3.814 | 5.281 |
| (8) $L_p/f_w$ | 0.077 | 0.523 | 0.331 |

Figure 2:
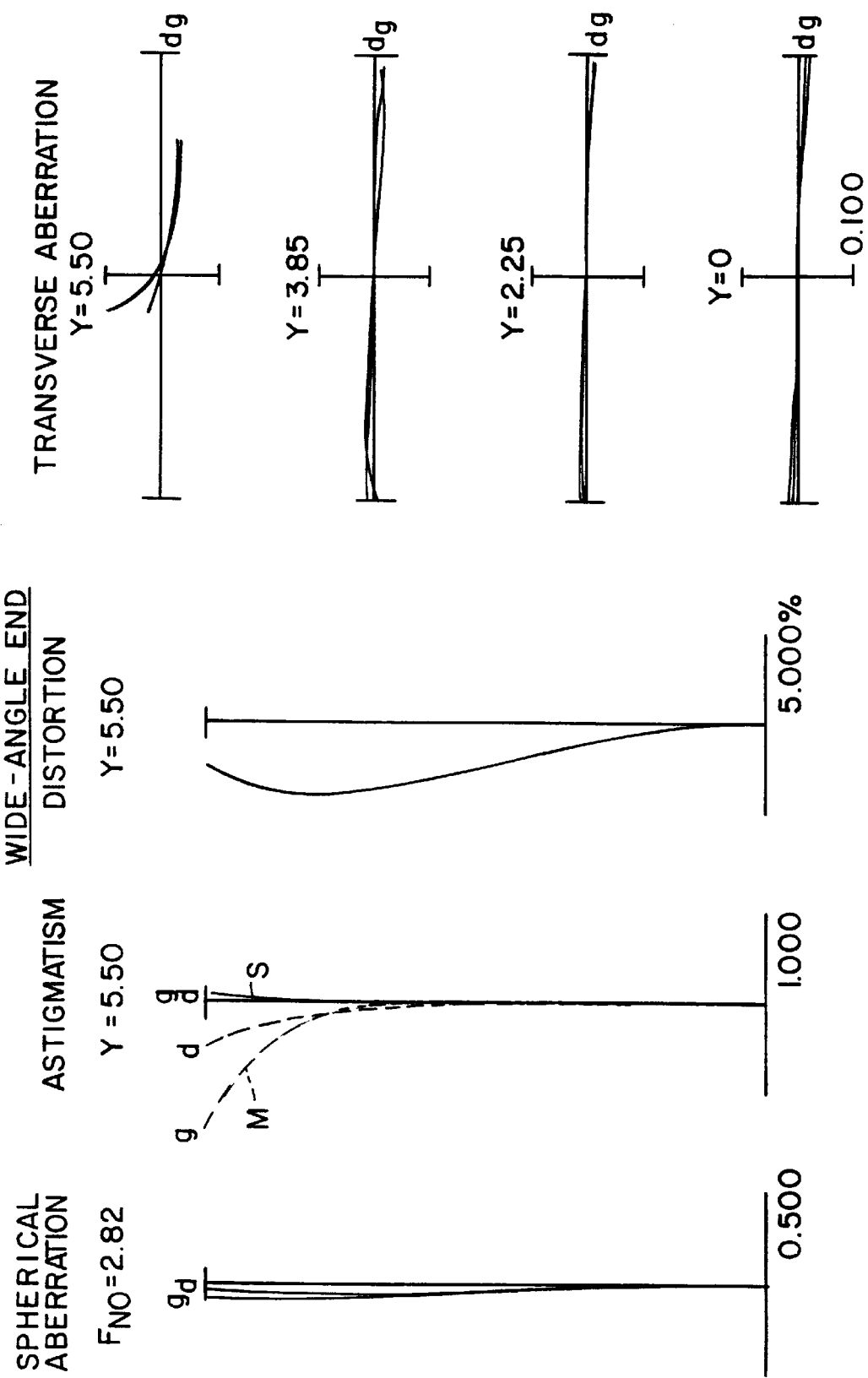
FIG. 2 is a diagram showing various aberrations at the wide-angle end for Embodiment 1.
Figure 5:
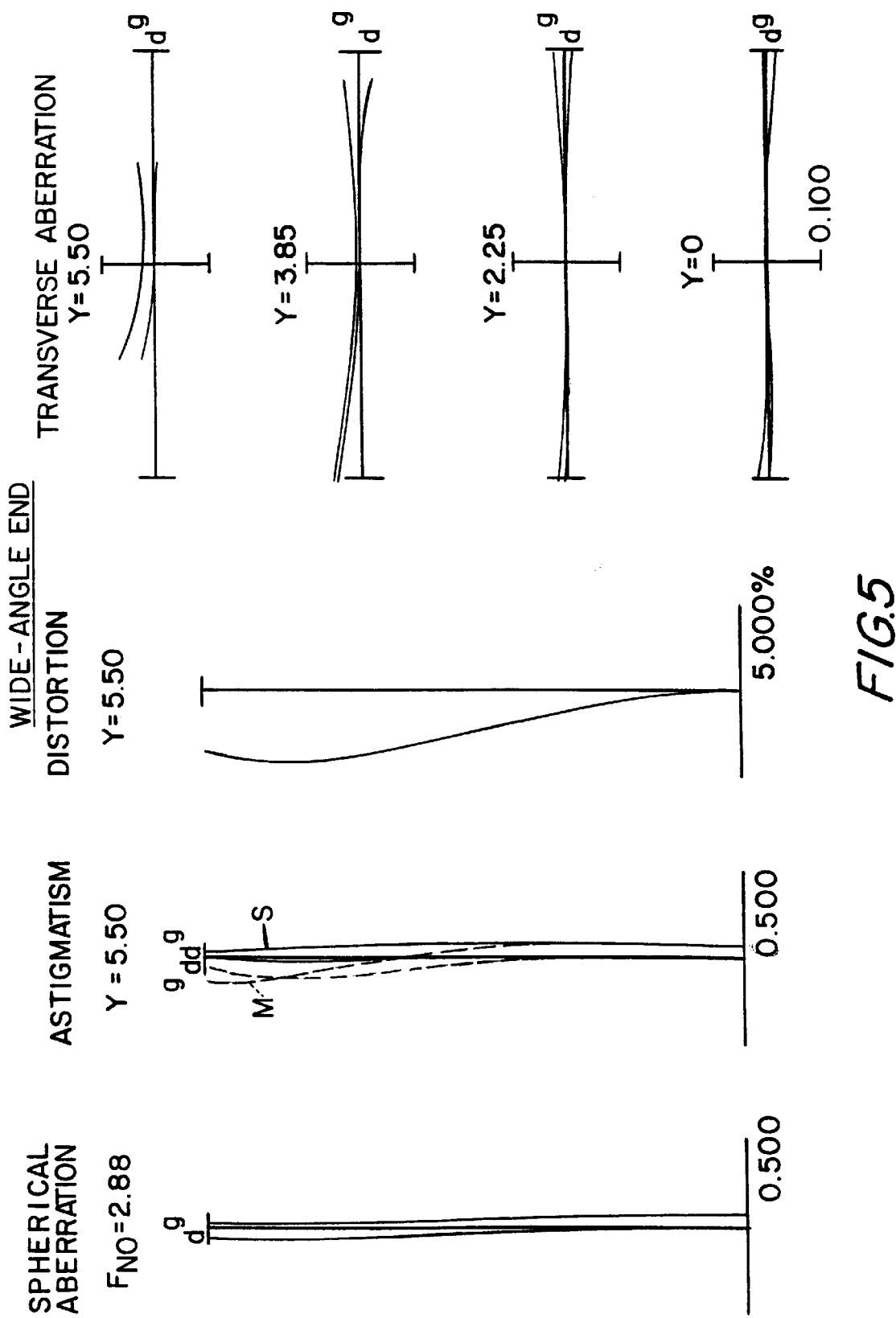
FIG. 5 is a diagram showing various aberrations at the wide-angle end for Embodiment 2.
Figure 6:
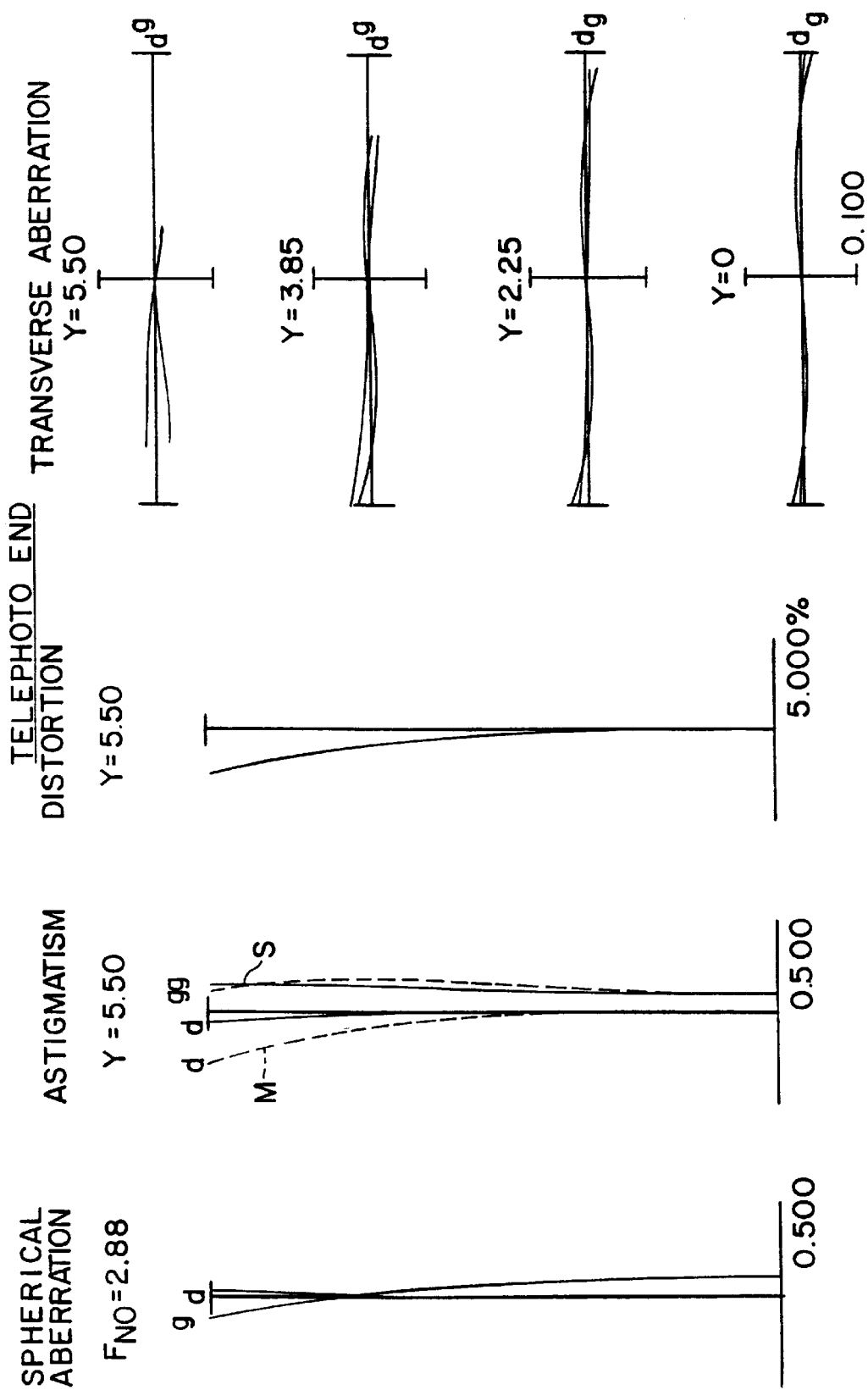
FIG. 6 is a diagram showing various aberrations at the telephoto end for Embodiment 2.
Figure 8:
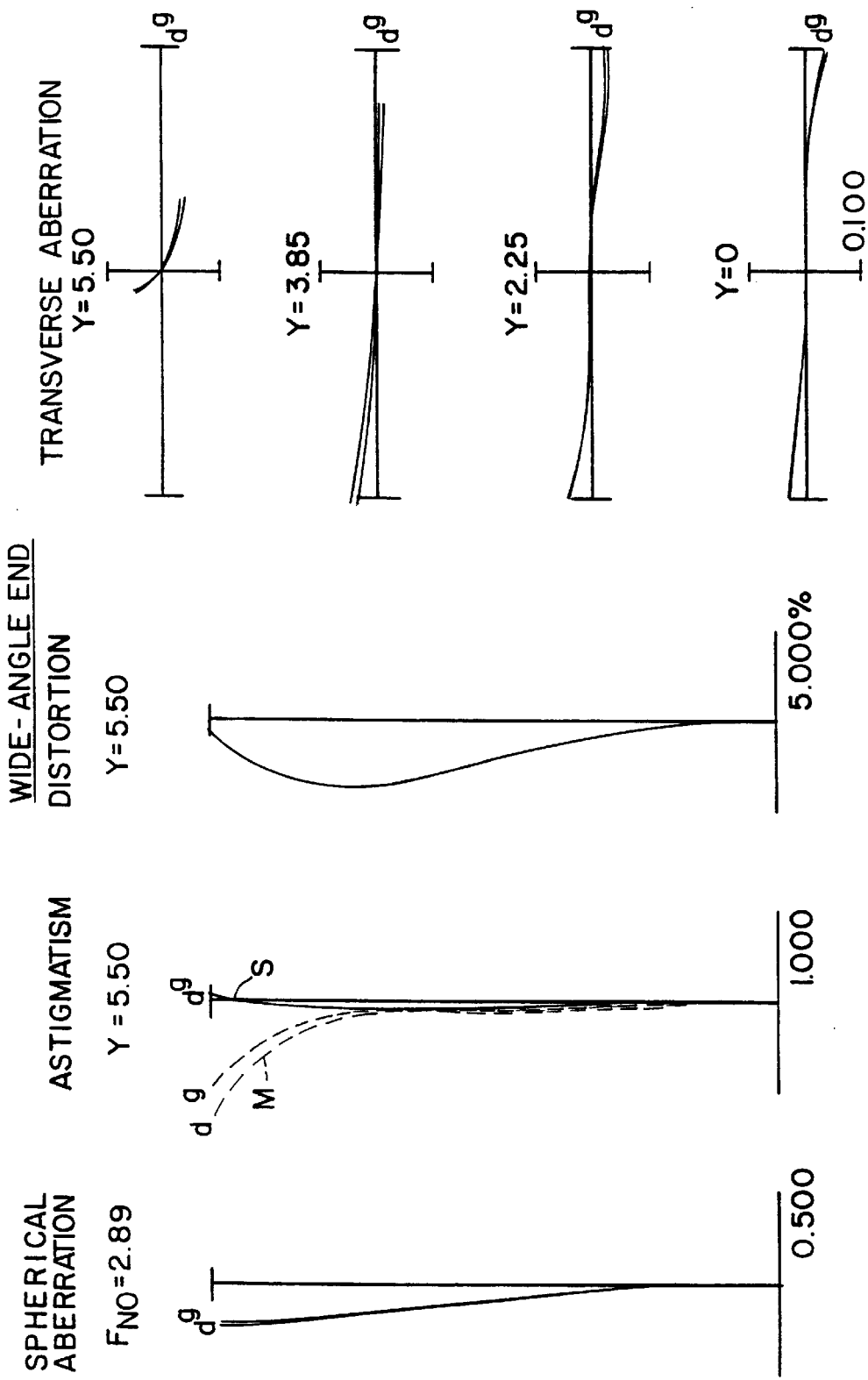
FIG. 8 is a diagram showing various aberrations at the wide-angle end for Embodiment 3.
Figure 9:
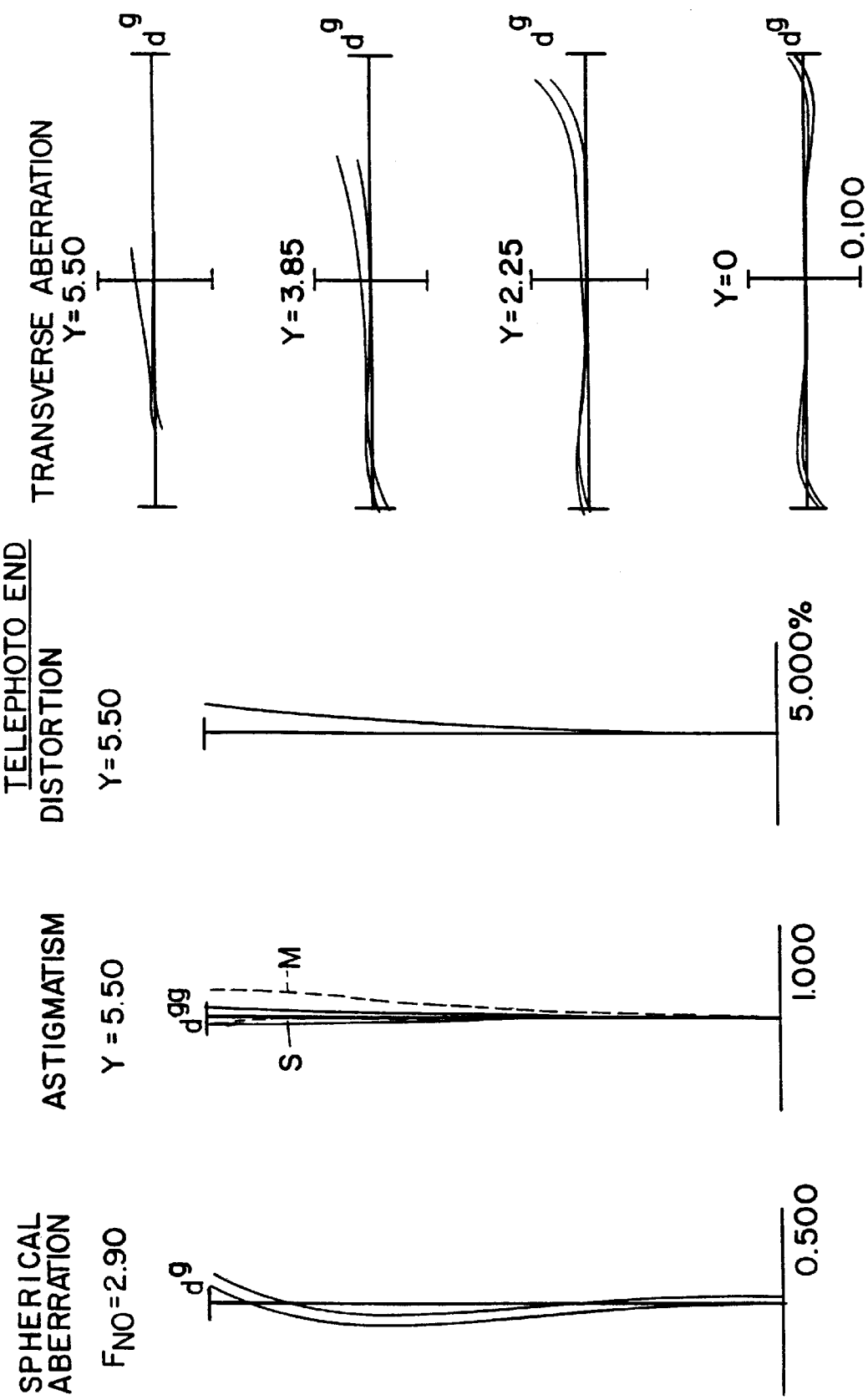
FIG. 9 is a diagram showing various aberrations at the telephoto end for Embodiment 3.

FIGS. 2 and 3 show for Embodiment 1, spherical aberration, astigmatism, distortion, and transverse aberration. As noted, FIG. 2 shows these features at the wide-angle end while FIG. 3 shows the telephoto end. In the same manner, FIGS. 5 and 6 respectively show various aberrations measured at the wide-angle end and the telephoto end in Embodiment 2. FIGS. 8 and 9 respectively show various aberrations measured at the wide-angle end and the telephoto end in Embodiment 3. In each of the aberrations, $F_{NO}$ is the F-number, Y is the image height. In the diagrams showing astigmatism, the solid line S shows the sagittal image plane. The dotted line M shows the meridional image plane.

As is apparent from each of the aberration diagrams, the various aberrations are excellently corrected in each of the focal objective states in all of the embodiments.

As described, according to the apparatus incorporating the principles of the present invention, a compact bright high-power zoom lens system has a wide-angle (field angle of equal to or larger than 70°) and an appropriate back focus and telecentricity. The apparatus incorporating the principles of the present invention makes auto-focusing possible if the zoom lens system is combined with a focus detection function.

Various modifications will become possible for those skilled in the art after receiving the teachings of the present disclosure without departing from the scope thereof.

What is claimed is:

1. A zoom lens system comprising, in order from the object end:
    a first lens group having a positive refractive power;
    a second lens group having a negative refractive power;
    a third lens group having a positive refractive power;
    a fourth lens group having a negative refractive power; and
    a fifth lens group having a positive refractive power, wherein the focal length of the zoom lens system, at the wide-angle end, is shorter than the diagonal line of the field of view, said fifth lens group is moved toward the object side and the lens separation of each of said lens groups is charged when zooming from the wide-angle end to the telephoto end, and at the same time, the following conditions are fulfilled:

$$2.0 < bf_w/F_w < 8.0$$

$$4.5 < L_w/y < 20.0$$

$$0.2 < f_1/(Fnt \cdot f_T) < 1.0$$

where:
        $bf_w$ is the back focus at the wide angle end of the zoom lens system;
        $L_w$ is the length at the wide-angle end from the first lens surface to the last lens surface (overall length);
        $f_w$ is the overall focal length of the zoom lens system at the wide-angle end;
        y is the maximum image height
        $f_T$ is the focal length at the telephoto end for the overall system;
        $F_{nT}$ is the F-number at the telephoto end when the overall system is in the full-aperture state; and
        $f_1$, is the focal length of said first lens group.

2. The zoom lens system, as claimed in claim 1, wherein the following condition is also fulfilled:

$$2.8 < bf_w/y < 10.0.$$

3. The zoom lens system, as claimed in claim 2, wherein the following condition is also fulfilled:

$$0.015 < |f_2/(F_{nT} \cdot f_T)| < 3.0$$

where:
        $f_t$ is the focal length at the telephoto end for the overall system;
        $F_{nT}$ is the F-number at the telephoto end when the overall system is in the full-aperture state; and
        $f_2$ is the focal length of said second lens group.

4. The zoom lens system, as claimed in claim 3, wherein at least one of said second lens group and said fourth lens group is fixed in the optical axial direction during zooming.

5. The zoom lens system, as claimed in claim 2, wherein at least one of said second lens group and said fourth lens group is fixed in the optical axial direction during zooming.

6. The zoom lens system, as claimed in claim 1, wherein the following condition is also fulfilled:

$$0.015 < |f_2/(F_{nT} \cdot f_T)| < 3.0$$

where:
        $f_T$ is the focal length at the telephoto end for the overall system;
        $F_{nT}$ is the F-number at the telephoto end when the overall system is in the full-aperture state; and
        $f_2$ is the focal length of said second lens group.

7. The zoom lens system, as claimed in claim 6, wherein at least one of said second lens group and said fourth lens group is fixed in the optical axial direction during zooming.

8. The zoom lens system, as claimed in claim 1, wherein at least one of said second lens group and said fourth lens group is fixed in the optical axial direction during zooming.

* * * * *